(12) United States Patent
Libby et al.

(10) Patent No.: US 11,969,921 B2
(45) Date of Patent: Apr. 30, 2024

(54) SYSTEM FOR CONTROLLING THE SIZING OF A RISING FOAM EMULSION WEB TRAVELLING ON A CONVEYOR

(71) Applicant: Mölnlycke Health Care AB, Gothenburg (SE)

(72) Inventors: Fred Libby, Waldoboro, ME (US); Tyler Kennedy, Harpswell, ME (US)

(73) Assignee: Mölnlycke Health Care AB, Gothenburg (SE)

( * ) Notice: Subject to any disclaimer, the term of this patent is extended or adjusted under 35 U.S.C. 154(b) by 0 days.

(21) Appl. No.: 17/922,617

(22) PCT Filed: Apr. 23, 2021

(86) PCT No.: PCT/EP2021/060636
§ 371 (c)(1),
(2) Date: Nov. 1, 2022

(87) PCT Pub. No.: WO2021/224023
PCT Pub. Date: Nov. 11, 2021

(65) Prior Publication Data
US 2023/0158721 A1    May 25, 2023

(30) Foreign Application Priority Data
May 4, 2020    (EP) ..................... 20172690

(51) Int. Cl.
*B29C 44/60*    (2006.01)
*B29C 44/46*    (2006.01)

(52) U.S. Cl.
CPC ............ *B29C 44/467* (2013.01); *B29C 44/60* (2013.01)

(58) Field of Classification Search
CPC ......... B29C 45/18; B29C 44/28; B29C 44/60; B29C 45/535
See application file for complete search history.

(56) References Cited

U.S. PATENT DOCUMENTS 3,240,846 A * 3/1966 Voelker ................... B29C 44/30
521/917
4,082,824 A * 4/1978 Del Carpio ............. B29C 44/30
264/DIG. 84
(Continued)

FOREIGN PATENT DOCUMENTS

| EP | 1361033 A2 | 11/2003 |
| WO | WO 92/00184 A1 | 1/1992 |
| WO | WO 00/47384 A2 | 8/2000 |

OTHER PUBLICATIONS

International Search Report and Written Opinion were mailed on Jun. 30, 2021 by the International Searching Authority for International Application No. PCT/EP2021/060636 filed on Apr. 23, 2021 and published as WO 2021/224023A1 (Applicant—Molnlycke Health Care AB) (14 pages).

*Primary Examiner* — Alison L Hindenlang
*Assistant Examiner* — Debjani Roy
(74) *Attorney, Agent, or Firm* — Ballard Spahr LLP (57) ABSTRACT

Described is a system for controlling the sizing of a rising foam emulsion web travelling on a conveyor. The system includes a plate arrangement and an actuating arrangement. The plate arrangement includes at least a first and a second plate, each having a web-facing lower side and an opposite upper side. The second plate is configured to be located downstream of the first plate with respect to the direction of travel of the foam emulsion web. The actuating arrangement includes a base portion and a top portion. The top portion is movable relative to the base portion and operatively connected to the plate arrangement. The actuating arrangement is configured to individually adjust for each plate a separating distance relative to the base portion, for controlling the rising of the foam emulsion web along at least a part of its travel.

19 Claims, 4 Drawing Sheets

(56) References Cited

U.S. PATENT DOCUMENTS

| | | | |
|---|---|---|---|
| 4,097,210 A | | 6/1978 | Romanillos |
| 4,120,626 A | * | 10/1978 | Keller ................... B29C 44/467 |
| | | | 425/363 |
| 4,267,135 A | | 5/1981 | Stroud et al. |
| 5,393,361 A | * | 2/1995 | Bareuter ............... B29C 44/321 |
| | | | 156/709 |
| 5,527,172 A | * | 6/1996 | Graham, Jr. ............ B29C 44/28 |
| | | | 425/89 |
| 2006/0167121 A1 | * | 7/2006 | Ehbing ................... B29C 44/60 |
| | | | 521/50 |
| 2008/0047666 A1 | * | 2/2008 | Knapp ................... B29C 44/467 |
| | | | 156/306.6 |

\* cited by examiner

Fig. 4 though adjusting a single plate is relatively easy and reduces the complexity for training, the provision of a single plate system may nevertheless result in other problems. In particular the ability to adjust specific areas along and/or across the web for detailed thickness control may be lost. Thus, there is still a need for a more complete solution.

SYSTEM FOR CONTROLLING THE SIZING OF A RISING FOAM EMULSION WEB TRAVELLING ON A CONVEYOR

CROSS-REFERENCE TO RELATED APPLICATIONS

This application is a U.S. National Phase Application of International Application No. PCT/EP2021/060636, filed Apr. 23, 2021, which claims priority to European Application No. 20172690.8, filed May 4, 2020, each of which are hereby incorporated by reference in their entirety.

TECHNICAL FIELD

The present invention relates to a system for controlling the sizing of a rising foam emulsion web travelling on a conveyor.

BACKGROUND ART

Different types of foams have been used in various fields of industry. For instance, in the field of wound care some wound dressings comprise a foam layer.

One way of producing the foam is to dispense a foam emulsion onto a moving conveyor, or onto a web (such as a paper web) covering the conveyor. As the dispensed foam emulsion travels along the conveyor it grows due to gas (such as carbon dioxide) forming pockets in the foam emulsion. The foam emulsion will eventually be cured to provide a firm foam web which may subsequently be cut into appropriately dimensioned pieces.

In order to control the thickness of the rising emulsion (which also spreads sideways), it is known to use a roller system in which a plurality of spaced apart rolls extend across the conveyor. The height of each roll can be individually adjusted to control the sizing of the rising foam emulsion web. The individual control of the rolls allows for detailed thickness control along and/or across the rising foam emulsion web, provided they are controlled correctly by an operator. Indeed, such a roller system requires extensive operator training and understanding. Inadequate operation of the system may cause undesirable thickness variations across and along the finished and cured foam web. This in turn leads to an increased amount of waste. The reason for the risk of thickness variations is due to the foam emulsion's ability to rise in the spaces present between neighbouring rolls.

To overcome these problems it has been suggested to replace the plurality of rolls with a single solid plate. Although such a solid plate overcomes the problem of spaces between the rolls and the resulting foam thickness variations, and although adjusting a single plate is relatively easy and reduces the complexity for training, the provision of a single plate system may nevertheless result in other problems. In particular the ability to adjust specific areas along and/or across the web for detailed thickness control may be lost. Thus, there is still a need for a more complete solution.

SUMMARY OF THE INVENTION

An object of the present invention is to provide a system which mitigates the drawbacks of the prior art systems. This and other objects, which will become apparent in the following disclosure, are accomplished by a system as presented in the accompanying independent claim. Some non-limiting exemplary embodiments are presented in the dependent claims and in the following disclosure.

The present invention is based on the realization that by using a plurality of adjustment points in combination with a plate-like arrangement, a detailed thickness control may be achieved with reduced risk of unwanted thickness variations. In particular, it has been realized that by using at least two plate segments instead of a single plate, the advantages of the solid plate may be maintained, reducing the risk of unwanted thickness variations, while at the same time allowing for additional adjustment points to provide for a more complete control of the foam web thickness with reduced complexity for training.

Accordingly, the inventors have provided a system for controlling the sizing of a rising foam emulsion web travelling on a conveyor, the system comprising:

a plate arrangement, comprising at least a first plate and a second plate, each plate having a web-facing lower side and an opposite upper side, wherein the second plate is configured to be located downstream of the first plate with respect to the direction of travel of the foam emulsion web; and an actuating arrangement comprising a base portion and a top portion, the top portion being movable relative to the base portion and being operatively connected to the plate arrangement, the actuating arrangement being configured to individually adjust for each plate of the plate arrangement a separating distance relative to the base portion, for controlling the rising of the foam emulsion web along at least a part of its travel.

The direction of travel may also be referred to as the machine direction. In a geometrical cartesian (x,y,z) coordinate system, the direction of travel may extend along the x-axis. The transverse direction which extends in the same horizontal plane as the direction of travel, may be along the y-axis. The height direction may thus extend along the z-axis. Accordingly, the base portion or at least a part of it may be located in a geometrical x-y-plane, and the separating distance of the plate relative to the base portion may be a distance along the z-axis. Thus, the actuating arrangement is configured to individually adjust for each plate of the plate arrangement a separating distance along the z-axis relative to a geometrical x-y-plane to which the z-axis is perpendicular. The separating distance along the z-axis is typically a vertical separating distance and the x-y-plane is typically a horizontal plane to which the z-axis is perpendicular.

The base portion may comprise a plurality of individual supports. The top portion may comprise a plurality of individual parts movable relative to the individual supports. As will be discussed later in this disclosure the actuator arrangement may comprise pairs of actuators for each plate, wherein each actuator in each pair may have a top portion and base portion. Thus, the base portion of each actuator may form an individual support, while the top portion of each actuator may form an individual movable part as described above. The top portion of the actuating arrangement may thus comprise individual top portions of respective actuators. Similarly, the base portion of the actuating arrangement may thus comprise individual base portions of respective actuators.

In some exemplary embodiments the base portion may be, or comprise, a flat surface, such as a table top, from which the above mentioned individual supports may extend.

When the system is provided for use at a conveyor, the actuating arrangement is configured to individually adjust for each plate arrangement a separating distance relative to the conveyor for controlling the rising of the foam emulsion web along at least a part of its travel.

From the above explanations it should be understood that the actuating arrangement is configured to individually adjust for each plate in the plate arrangement its height/altitude by moving the top portion of the actuating arrangement (or parts of the top portion, such as the individual top portion(s) of one or more actuators comprised in the actuating arrangement) in a vertical direction relative to the base portion.

It should be understood that the plate arrangement may comprise more than two plates. For instance, the plate arrangement may comprise three, four, five, six or even more consecutively arranged plates along the direction of travel. Such plurality of plates in a plate arrangement will, however, be discussed in more detail further below in this disclosure.

The foam emulsion will normally get larger in all directions. Thus, during the travel (along the x-axis) of the foam emulsion web, it will not only become higher (along the z-axis), but also wider (along the y-axis). Therefore, the shapes of the individual plates may suitably be adapted accordingly, i.e. getting wider along the direction of travel. This is reflected in at least one exemplary embodiment, according to which the width of each plate increases from an upstream end of the plate to a downstream end of the plate, upstream and downstream being defined with respect to the direction of travel. The widening may suitably be a continuous widening from the upstream end to the downstream end of the plate, however, other options such as stepwise widening are conceivable but less desirable. The widening may suitably be at a constant rate from the upstream end to the downstream end, however, other options such as increasing or decreasing rate of widening from the upstream end to the downstream end may also be conceivable. Suitably, the widening may be substantially symmetrical with respect to the direction of travel (x-axis).

According to at least one exemplary embodiment, the width of the upstream end of the second plate substantially corresponds to the width of the downstream end of the first plate. This is advantageous since it provides a smooth widening control as the foam emulsion web during its travel passes from the first plate to the second plate. The width of the upstream end of the second plate may, in some exemplary embodiments, be slightly larger than the width of the downstream end of the first plate.

According to at least one exemplary embodiment, the plates of the plate arrangement form a truncated triangular shape. The truncated triangular shape may be symmetrical, such as in the form of an isosceles trapezoid (American English), which may also be referred to as an isosceles trapezium (British English). The base of the triangular shape will be at the downstream end of the plate arrangement, and the truncated top of the triangular shape will be at the upstream end of the plate arrangement. In addition to the plates forming a truncated triangular shape for the plate arrangement as such, each individual plate may suitably have a truncated triangular shape, the base of the triangle being at the downstream end of the plate, while the truncated top of the triangle being at the upstream end of the plate.

According to at least one exemplary embodiment, the actuating arrangement is configured to individually adjust for each plate of the plate arrangement the inclination of its web-facing lower side relative to the base portion of the actuating arrangement (thus, in practical use, relative to the conveyor). By enabling adjustment of the inclination the shaping of the rising foam emulsion web can be made more accurate and more controlled. It should be noted that each plate may be inclinable in more than one direction. Suitably, each plate is tiltable about at least one of the roll axis, the pitch axis and the yaw axis. Using the x,y,z-coordinates above, the roll axis will correspond to the x-axis, i.e. the direction of travel. The pitch axis will correspond to the y-axis, i.e. a lateral or width direction. The yaw axis will correspond to the z-axis, i.e. the height or vertical direction. Thus, if a plate has a pitch relative to the base portion, the plate has been tilted about the pitch axis; if a plate has a roll relative to the base portion, the plate has been tilted about the roll axis; and if a plate has a yaw relative to the base portion, the plate has been tilted about the yaw axis.

In line with the above explanation, according to at least on exemplary embodiment, each plate is rotatable about a respective geometrical pitch axis extending transversely to the direction of travel, whereby the pitch of each plate relative to the base portion is adjustable so that the spacing between the downstream end of the web-facing lower side and the base portion is larger than the spacing between the upstream end of the web-facing lower side and the base portion. Thus, in use, each plate can be inclined so as to control the pitch of the plate relative to the conveyor (and thus relative to the rising foam emulsion web). This may for instance, be achieved by rotating one or more shafts, or the like, attached to each plate, wherein the attached shaft (or shafts) may be rotated around its own axis, as will exemplified in more detail below. By adjusting the pitch of the plate, in combination with adjusting the height of the plate (i.e. the separating distance to the base portion), an accurate sizing may be achieved during the rising of the foam emulsion web. For instance, by arranging the height of the first plate and the second plate (and any further plate) at different heights, but with the same pitch, the foam emulsion web may pass under a substantially continuous plate arrangement surface formed by the web-facing sides of the plates. The plates may suitable be arranged close to, in contact with, and/or overlapping, each other.

According to at least one exemplary embodiment, each plate is rotatable about a geometrical roll axis extending in the direction of travel, whereby the roll of each plate relative to the base portion of the actuating arrangement is adjustable. This is advantageous since it also allows for lateral sizing control of the rising foam emulsion web. This may for instance, be achieved by attaching one or more shafts, or the like, to each plate, and raising one end of such a shaft or shafts vertically to a higher level than any other end of the shaft or shafts, as will be exemplified in more detail below.

Although it is generally desirable to have the downstream end of the plate (and the upstream end of the plate) extending perpendicularly to the direction of travel, it is nevertheless conceivable, at least in some exemplary embodiments, to control the yaw of the plate relative to the base portion. Thus, according to some exemplary embodiments, each plate is rotatable about a geometrical yaw axis extending perpendicular to both the roll axis and the pitch axis, wherein the yaw of each plate relative to the base portion of the actuating arrangement is adjustable.

According to at least one exemplary embodiment, the allowable separating distance of the first plate relative to the base portion (and, in use, relative to the conveyor) is dependent on the current position of the second plate. This is advantageous since inadvertent misalignments between the first plate and the second plate can be avoided, and thus a smoothly controlled sizing of the rising foam emulsion web can be achieved. In particular, the allowable separating distance of the first plate relative to the base portion of the actuating arrangement may be shorter than or equal to the current separating distance of the second plate relative to the base portion of the actuating arrangement. Thus, in such embodiments, if the second plate is at a certain height, the first plate is prevented from being placed at a height above the second plate. Similarly, in exemplary embodiments in which the plate arrangement has a third or more plates downstream of the second plate, then the allowable separating distance of the second plate relative to the base portion is dependent on the current position of the third plate, suitably such that the second plate is prevented from being placed at a height above the height of the third plate. Thus, in general terms, in at least some exemplary embodiments, for any plate having a neighbouring plate downstream of said any plate, the allowable separating distance of said any plate relative to the base portion is dependent on the current position of said neighbouring plate. In at least some exemplary embodiments, said any plate is prevented from being placed at a height above the height of said neighbouring plate.

The height to which a plate is allowed to be lifted, i.e. the respective allowable separating distance for each plate, may be electronically and/or mechanically controlled. For instance, according to at least one exemplary embodiment, the system comprises a control unit for controlling the actuating arrangement, wherein the control unit is configured to set an electronic lift limitation, preventing the actuating arrangement from exceeding said allowable separating distance for the first plate. The control unit may suitably have a memory in which individual lift limitation values may be stored for each plate. The input to the memory may either be manual or automatic. For instance, an operator may store the lift limitation values for each plate, or the control unit may include a calculating unit which calculates the lift limitation values and stores them in the memory. The calculation of the lift limitation value of one plate may be based on the current position of another plate, and/or based on feedback from sensors monitoring the progress of the rising foam emulsion web. In some exemplary embodiments, an operator may set the separating distance of the second plate, and then the control unit may calculate the lift limitation value of the first plate and automatically store that value in its memory. In some exemplary embodiments, sensors, such as optical and/or ultrasound sensors, may be provided to monitor the rising of the foam emulsion web along its travel, and may send feedback signals to the control unit, which may adjust the different plates based on the received feedback signals. The adjustment may for example be individual adjustment of the height, pitch, roll and/or yaw of each plate.

The expression "control unit" as used above should be understood to include any type of computing device such as an ASIC, a micro-processor, etc. It should also be understood that the actual implementation of such a control unit may be divided between more than a single device/circuit. For instance, one device/circuit of the control unit may receive data generated by any sensors, while another device/circuit of the control unit may receive data generated via a user interface accessed by an operator, and a third device/circuit of the control unit may, based on the received data, determine and set the position, inclination, etc. of one or more plates of the plate arrangement. In other embodiments one device/circuit may be connected to sensors as well as to a user interface. The connections to the control unit may be wired or wireless connections.

As mentioned above, the system may have a mechanical lift limitation function in addition to the electronic lift limitation, or instead of the electronic lift limitation. This is reflected in at least one exemplary embodiment, according to which, an upstream portion of the second plate is configured to overlap a downstream portion of the first plate. The upstream portion of the second plate may thus function as a mechanical stop for the downstream portion of the first plate.

As mentioned above each plate may be attached to one or more shafts or the like for controlling the motion of the plate. For instance, one shaft may extend from one lateral side of the plate and another shaft may extend from the other lateral side of the plate. However, in some exemplary embodiments, the shaft may be in the form of a cross member extending over and beyond both lateral sides of the plate, i.e. transversely to the direction of travel (i.e. along the above described y-axis or pitch axis). According to at least one exemplary embodiment, each plate may be attached to a respective cross member.

Furthermore, irrespective of a plate being connected to a cross member, or to two shafts extending in opposite lateral directions from the plate, the actuating arrangement may suitably comprise one pair of actuators for each plate of the plate arrangement. One actuator in the pair of actuators will be located on one lateral side of the plate and the other actuator will be located on the other lateral side of the plate. Accordingly, in use, the conveyor and the foam emulsion web will travel between the pair of actuators. The pairs of actuators are suitably arranged one after the other along the direction of travel and in parallel with the respective associated plate. By controlling each actuator of said pair of actuators individually, e.g. raising/extending one actuator more than the other one, a roll of the plate may be achieved. By raising/extending both actuators the same amount, the height/altitude of the plate may be controlled. By having the shafts or cross member rotationally engaged in the actuators, the pitch of the plate may be controlled.

According to at least one exemplary embodiment, the actuating arrangement comprises a first cross member attached to the first plate and a second cross member attached to the second plate, wherein the actuating arrangement further comprises a first pair of actuators and a second pair of actuators, the first cross member being configured to extend in a transverse direction over the conveyor from one of the actuators to the other one of the actuators of the first pair, and the second cross member being configured to extend in a transverse direction over the conveyor from one of the actuators to the other one of the actuators of the second pair. In embodiments of the system having further plates, there may of course be respective further cross members and further pairs of actuators.

As understood from above, according to at least one exemplary embodiment, each actuator is individually movable in a vertical direction relative to the conveyor. In particular, a top portion of each actuator is individually liftable in a vertical direction relative to the base portion of that actuator, and relative to the conveyor. Thus, the entire actuator as such may become extended when the top portion of the actuator is lifted relative to the base portion of the actuator. Thus, in use, the base portion of each actuator may suitably be substantially stationary in the vertical direction relative to the conveyor. The base portion of each individual actuator may form part of the base portion of the entire actuating arrangement. Similarly, the top portion of each individual actuator may form part of the top portion of the entire actuating arrangement.

As understood from the above explanation, in accordance with at least one exemplary embodiment, each cross member may be rotatably connected to the respective pair of actuators for enabling inclination of the attached plate, such as raising the downstream end of the plate relative to the upstream end of the plate. Thus, the pitch of each plate may be adjusted by rotating the cross member.

In those exemplary embodiments in which a control unit is provided, such a control unit may suitably be configured to control the vertical movement of each actuator and the rotational orientation of the cross member.

As mentioned previously, the plate arrangement may comprise one or more plates located downstream of the second plate. It should thus be understood that the inter-relationship between the second plate and a third plate may suitably correspond to the inter-relationship between the first plate and the second plate. Thus, the features of the embodiments discussed above with respect to the first plate and the second plate, may in other exemplary embodiments be generalized to refer to any plate (i.e. instead of the first plate) and a neighbouring plate (instead of the second plate) located downstream of said any plate.

In those exemplary embodiments which include a control unit, such a control unit may suitably be configured to set a respective electronic lift limitation to each plate of the plate arrangement, preventing the actuating arrangement from exceeding a respective allowable separating distance of each plate relative to the base portion of the actuating arrangement. For instance, if the control unit has a first, second, third, and possibly further plates arranged after each other from upstream to downstream the direction of travel, then suitably the control unit will limit the allowable separating distance of the first plate relative to the base portion of the actuating arrangement to be the smallest allowable separating distance, and sequentially increasing the allowable separating distance for each plate in the sequence downstream from the first plate.

DETAILED DESCRIPTION

Figure 1:
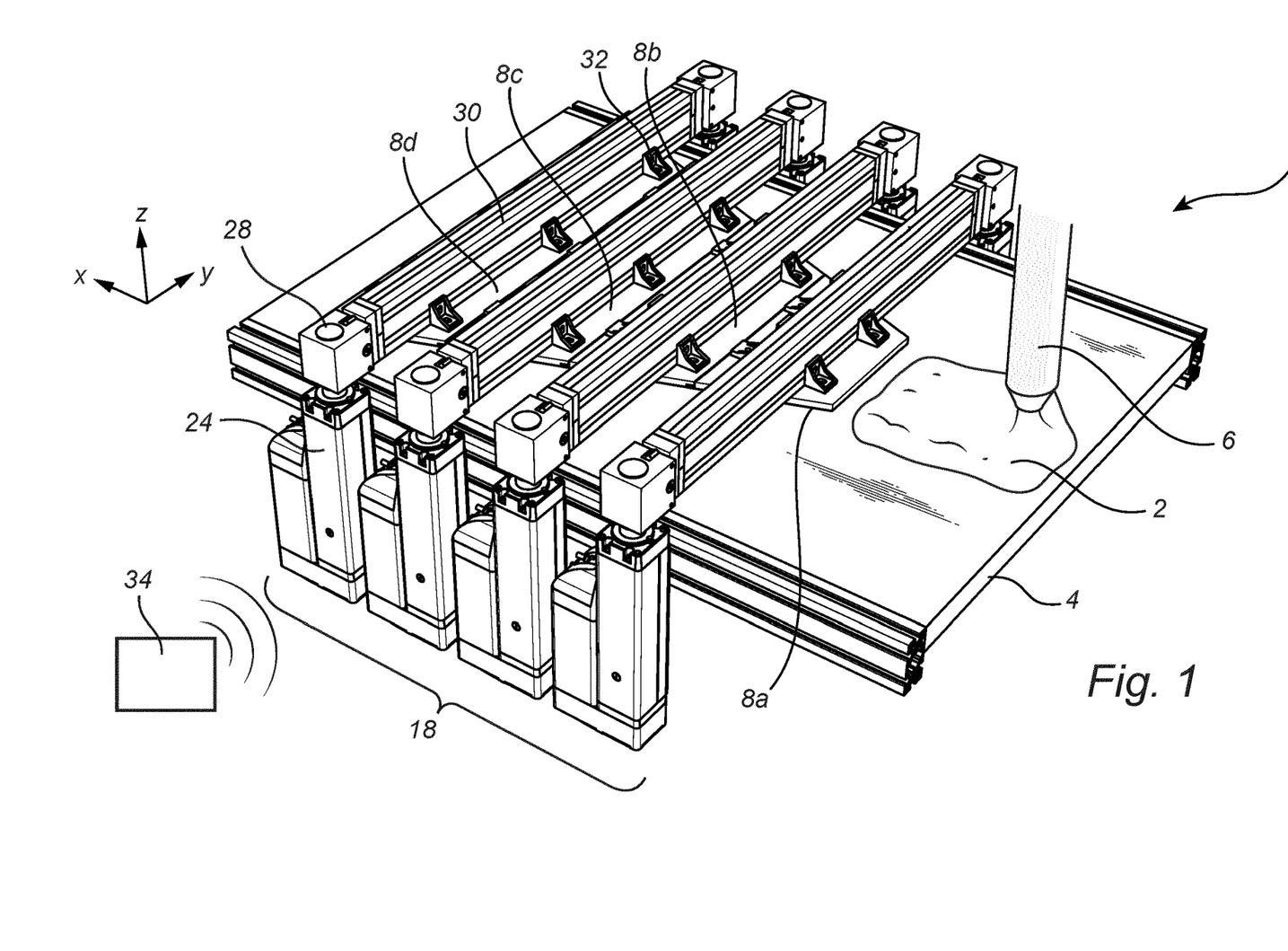
FIG. 1 illustrates, in a perspective view, a system in accordance with at least one exemplary embodiment of the invention.

FIG. 1 illustrates, in a perspective view, a system 1 in accordance with at least one exemplary embodiment of the invention. Thus, FIG. 1 illustrates a system 1 for controlling the sizing of a rising foam emulsion web travelling on a conveyor 4.

Figure 2:
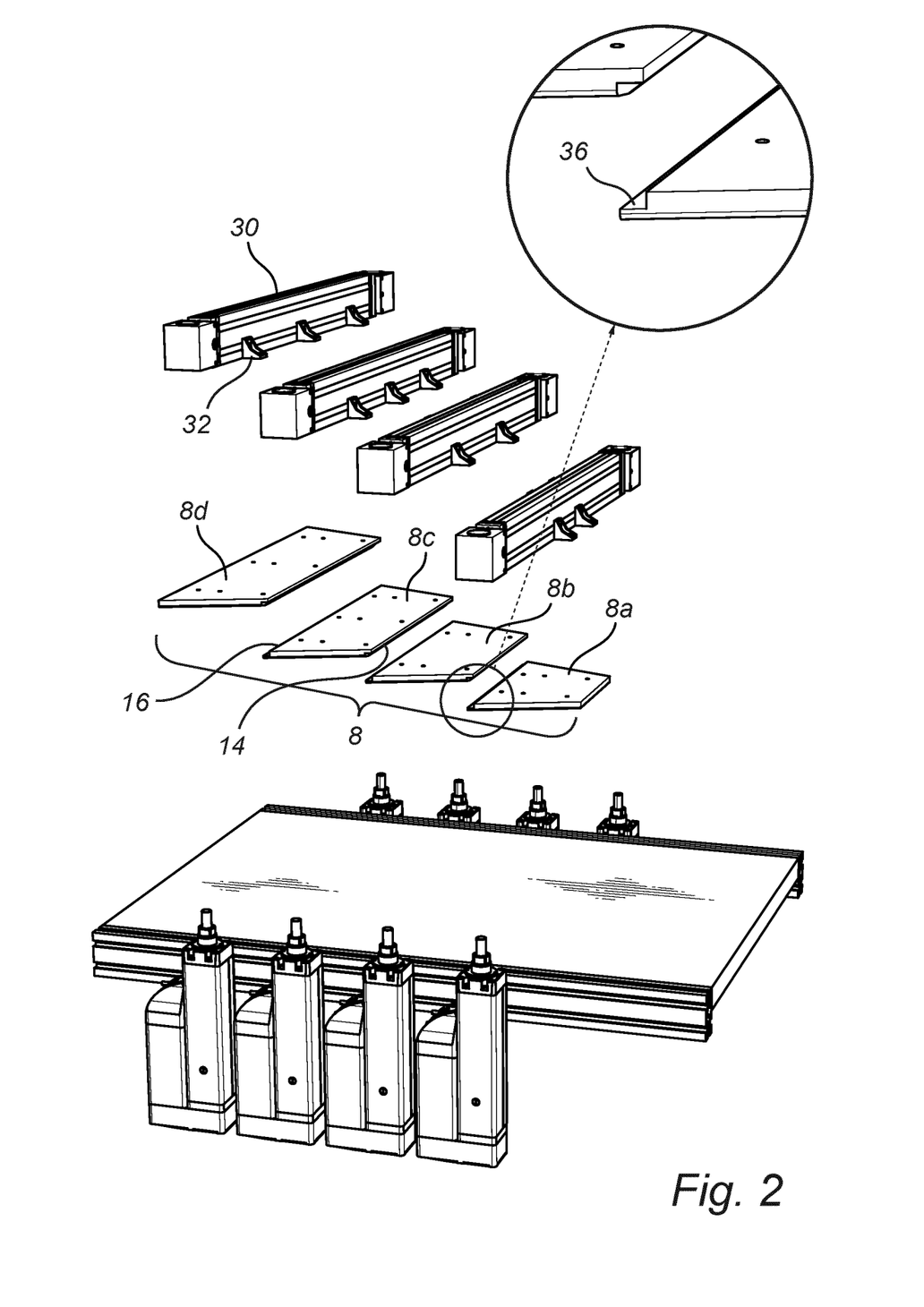
FIG. 2 is a partly exploded view of the exemplified system shown in FIG. 1.

As schematically indicated foam emulsion 2 is dispensed from a nozzle 6 or other dispensing means onto the moving conveyor 4 or a web (such as a paper web) on the conveyor 4. The foam emulsion 4 is dispensed at an area located upstream of a plate arrangement 8 of the system 1 (the plate arrangement is best indicated in FIG. 2). As the conveyor 4 moves, the dispensed foam emulsion 2 will move along with the conveyor 4 and will travel under the plate arrangement 8 and then continue downstream of the plate arrangement 8. During its travel, the foam emulsion 2 will form a continuous foam emulsion web which will grow, rising upwardly as well as expanding laterally. As indicated in FIG. 1, in a Cartesian x-, y-, z-coordinate system, the direction of travel (i.e. the machine direction) may be along the x-axis. The lateral direction may correspond to the y-axis, and the height may correspond to the z-axis.

The plate arrangement 8 comprises at least two plates, in the presently illustrated exemplary embodiment, the plate arrangement 8 comprises four plates 8a-8d, namely a first plate 8a, a second plate 8b, a third plate 8c and a fourth plate 8d (as best seen in FIG. 2). It should be understood that other number of plates, such as three, five or more are conceivable in other exemplary embodiments.

Figure 3:
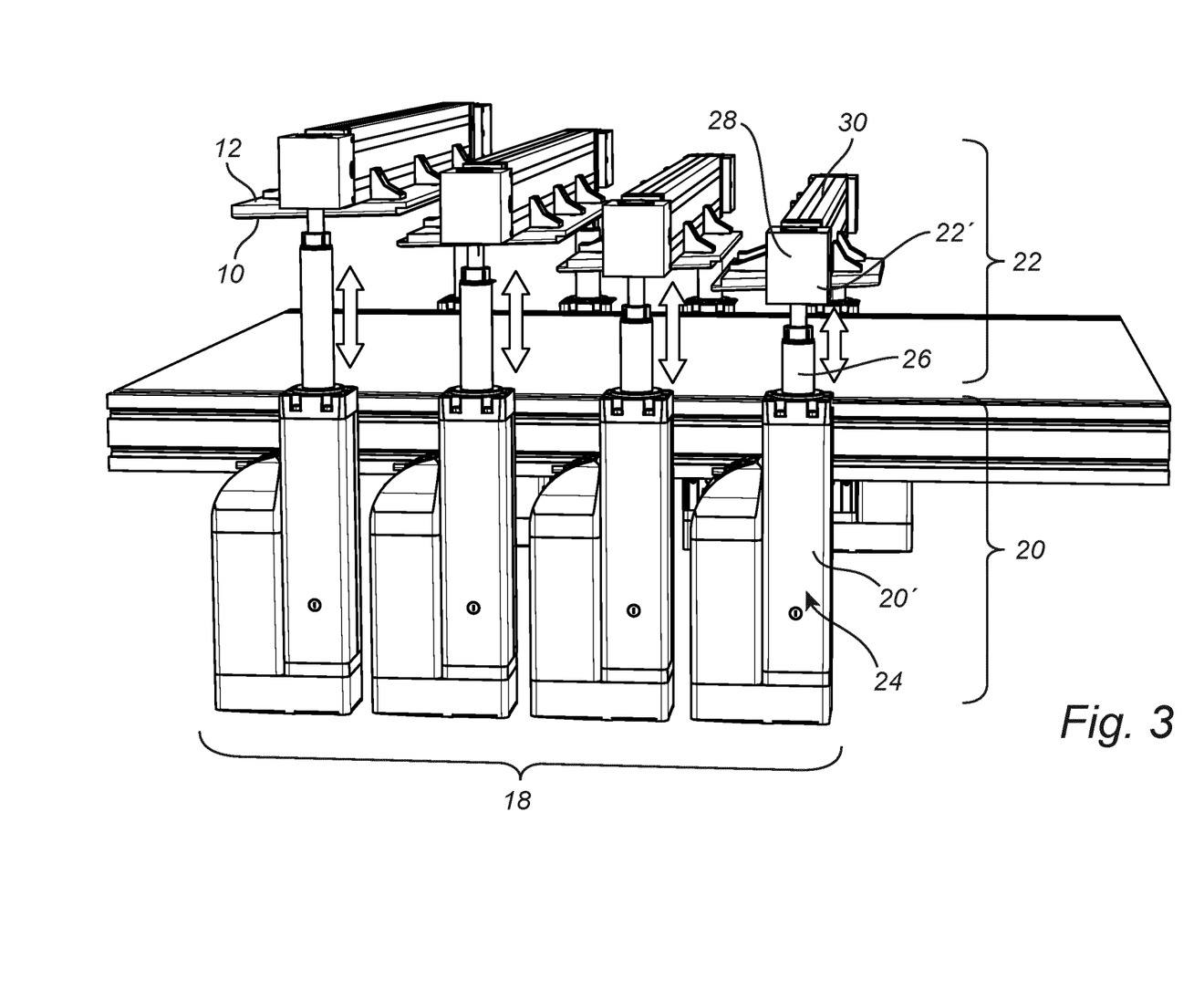
FIG. 3 illustrates, in a lateral perspective view, the exemplified system shown in FIG. 1, wherein the plates of the plate arrangement have different positions compared to the positions shown in FIG. 1.

Each plate 8a-8d has a web facing lower side 10 and an opposite upper side 12 (see FIG. 3). As can be seen in the figures, any plate located downstream of a neighbouring upstream plate may suitably present a larger surface area than its upstream neighbouring plate. Thus, the second plate 8b, which is located downstream of the first plate 8a with respect to the direction of travel of the foam emulsion web, may have a larger surface area than the first plate 8a. Similarly, the third plate 8c may have a larger surface area than the second plate 8b, and the fourth plate 8d may have a larger surface area than the third plate 8c.

The width of each plate 8a-8e may suitably increase from an upstream end 14 of the plate to a downstream end 16 of the plate. In FIG. 2 the upstream end 14 and downstream end 16 has been indicated for the third plate 8c. Suitably, each plate 8a-8e forms a truncated triangular shape. As can be seen in FIG. 1 and FIG. 2, for any pair of neighbouring plates, there will be an upstream end 14 of one plate which is adjacent a downstream end 16 of another plate. For such neighbouring plates, the upstream end 14 of one plate may suitably have a width (i.e. extension in the y-direction) which corresponds to the neighbouring downstream end 16 of other plate. For instance, the width of the upstream end of the second plate 8b may substantially correspond to the width of the downstream end of the first plate 8a. Similarly the width of the upstream end of the third plate 8c may substantially correspond to the width of the downstream end of the second plate 8b, and the width of the upstream end of the fourth plate 8d may substantially correspond to the width of the downstream end of the third plate 8c.

To control the sizing of the rising foam emulsion web, the plates 8a-8d may be lifted and or rotated/inclined. To this end, the system 1 comprises an actuating arrangement 18 for controlling the plates (see FIG. 1 and FIG. 3). As best seen in FIG. 3, the actuating arrangement 18 comprises a base portion 20 and a top portion 22, wherein the top portion 22 is movable relative to the base portion 20 and is operatively connected to the plate arrangement 8.

With further reference to FIG. 3, in this exemplary embodiment, the base portion 20 may suitably stand on a ground or other stationary surface. The parts of the actuating arrangement 18 that, in normal operation, are configured to be stationary relative to the ground may thus be regarded as forming part of the base portion 20 of the actuating arrangement 18. It follows, that parts that are configured to be movable may form part of the top portion 22 of the actuating arrangement 18.

The actuating arrangement 18 may suitably comprise at least one individual actuator 24 for each plate. Suitably, as illustrated in FIG. 3, each plate is associated with a pair of actuators, wherein one actuator of the pair is located on one lateral side of the associated plate and the other actuator of the pair is located on the other lateral side of the associated plate. Thus, the pair of actuators are spaced apart along the y-axis.

In FIG. 3 each individual actuator 24 of the actuating arrangement 18 is illustrated as having an individual bottom portion 20' and an individual top portion 22'. The individual bottom portion 20' may form a housing in which an actuator spindle 26 may be vertically movable, between a completely retracted position (i.e. the lowest vertical position) to various extended positions. As illustrated in FIG. 3, The actuating spindles 26 associated with the different plates have been illustrated as presently arranged in different extended positions, i.e. different lift heights for the associated plates. The extended positions may in some exemplary embodiments be set in a step-less manner, while in other exemplary embodiments the extended positions may be set in steps. The actuator spindle 26 may be driven by any suitable means, such as by an electric motor and gears, pneumatically, hydraulically or any other suitably way for lifting and lowering the actuator spindles.

In the illustrated exemplary embodiment, at the top of each actuator spindle 26 there is provided a connector 28. The connector 28 thus follows the vertical movements of the actuator spindle 26. Thus, for each individual actuator 24 the connector 28 and the actuator spindle 26 may form part of the individual top portion 22' of the actuator 24. The individual top portions 22' may in turn collectively form part of the top portion 22 of the entire actuating arrangement 18.

The actuating arrangement 18 of the illustrated exemplary embodiment further comprises a plurality of cross members 30, one cross member 30 for each plate 8a-8d. The cross members 30 are attached to the plates 8a-8d by any suitable means, such as via brackets, screw connections, welding, gluing, etc. In the present illustration, the cross members 30 have been attached by brackets 32 to the respective plate 8a-8d. Each cross member 30 extends between the pair of actuators 24 that is associated with the plate to which the cross member 30 is attached. More particularly, in the illustrated example, the cross member 30 extends between the connectors 28 of the respective actuators 24. Thus, each cross member 30 extends in a transverse/lateral direction (y-direction) over the conveyor 4 from one of the actuators of the pair of actuators to the other one of the actuators of the pair of actuators.

The actuating arrangement 18 is configured to individually adjust for each plate 8a-8d of the plate arrangement 8 a separating distance relative to the base portion 20 for controlling the rising of the foam emulsion web along at least a part of its travel. In other words, the actuating arrangement 18 is configured to individually adjust the lifting height for each plate 8a-8d relative to the conveyor 4. In the illustrated exemplary embodiment, this may suitably be done by raising the actuator spindles 26 of both actuators 24 associated with a plate to be lifted, thereby raising the connectors 28 and the cross member 30, and consequently also raising the plate. By having separate actuators, or pairs of actuators, associated with each plate, each plate may be individually adjusted.

Suitably, the actuating arrangement 18 may be configured to individually adjust not only the lift height of each plate 8a-8d, but also the inclination of the web-facing lower side 10 of each plate relative to the base portion 20, i.e. relative to the conveyor 4. The inclination may be about a pitch axis (in this case corresponding to the y-axis) or about a roll axis (in this case corresponding to the x-axis).

Thus, in at least some exemplary embodiments, each plate 8a-8d is rotatable about a respective geometrical pitch axis extending transversely to the direction of travel, whereby the pitch of each plate 8a-8d relative to the base portion 20 (and the conveyor 4) is adjustable so that the spacing between the downstream end 16 of the web-facing lower side 10 and the base portion 20 is larger than the spacing between the upstream end 14 of the web-facing lower side 10 and the base portion 20. To achieve this, each cross member 30 may suitably be rotatably connected to the associated connectors 28, thereby enabling rotation of each plate 8a-8d about a respective geometrical pitch axis. Suitably, the connectors 28 may be provided with an electric motor or other means for achieving a rotational motion of the connected cross member 30.

Furthermore, each plate 8a-8d may be rotatable about a geometrical roll axis extending in the direction of travel, whereby the roll of each plate 8a-8d relative to the base portion 20 (and the conveyor) is adjustable. This may be achieved by raising one of the actuator spindles 26 to a higher level than the other actuator spindle 26 to which a cross member 30 is connected (via the connectors 28), thus tilting the cross member 30 and the attached plate about the roll axis.

As mentioned previously in this disclosure, in other exemplary embodiments it may also be conceivable to adjust each plate 8a-8d around a yaw axis (z-axis).

In order to achieve a smooth sizing of the rising foam emulsion web, the separating distance relative to the base portion 20 may suitably be controlled based on the position of the neighbouring plate or plates. For instance, the allowable separating distance of the third plate 8c relative to the base portion 20 (and conveyor 4) may be dependent on the current position of the fourth plate 8d. Similarly, the separating distance of the second plate 8b may be dependent on the current position of the third plate 8c, and the separating distance of the first plate 8a may be dependent on the current position of the second plate 8b. Suitably, a plate should not be able to be lifted to a higher vertical level (z-axis) than any plate downstream thereof.

As illustrated in FIG. 1 there may be provided a control unit 34 for controlling the actuating arrangement 18. The control unit 34 may thus be configured to control the vertical movement of each actuator 24 and the rotational orientation of the cross member 30. The control unit 34 may be configured to set an electronic lift limitation, preventing the actuating arrangement 18 form exceeding an allowable separating distance for the respective plate 8a-8d.

The control unit 34 may suitably communicate with the actuating arrangement 18 wirelessly (as illustrated in FIG. 1) or by wire. The control unit 34 may comprise or may be comprised in a processing circuitry. The processing circuitry may include a microprocessor, microcontroller, programmable digital signal processor or another programmable device. The processing circuitry may also, or instead, include an application specific integrated circuit, a programmable gate array or programmable array logic, a programmable logic device, or a digital signal processor. Where the processing circuitry includes a programmable device such as the microprocessor, microcontroller or programmable digital signal processor mentioned above, the processor may further include computer executable code that controls operation of the programmable device. It should be understood that all or some parts of the functionality provided by means of the processing circuitry (or generally discussed as "processing circuitry") may be at least partly integrated with the control unit 34. Thus, the control unit 34 may comprise or be connected to one or more electronic memories for storing lift limitation values for each actuator 24.

As an additional option, or in alternative embodiments, an upstream portion of the second plate may be configured to overlap a downstream portion of the first plate; the upstream portion of the third plate may be configured to overlap a downstream portion of the second plate; and the upstream portion of the fourth plate may be configured to overlap a downstream portion of the third plate. This is illustrated by the enlarged detailed view in FIG. 2, wherein a ledge 36 is shown at the upstream end of the first plate 8a. When the first plate 8a is lifted, the ledge 36 will stop against the web-facing lower side of the downstream end of the second plate 8b, thereby preventing the first plate 8a from further movement.

In use, the control unit 34 may suitable be operated for setting the respective lift height of each plate 8a-8d, and any inclination (such as the roll or pitch) to control the sizing of the rising foam emulsion web. As the process progresses, the settings may be adjusted if considered appropriate for achieving the desired dimensions and homogeneity of the foam.

In a production process, the foam thickness is normally specified by setting a lower limit (i.e. a minimum thickness) and an upper limit (i.e. a maximum thickness). If the thickness of the produced foam web is outside the range defined by the lower and upper limits, then it is regarded as a failed product, i.e. not according to the specification, and may be discarded.

Figure 4:
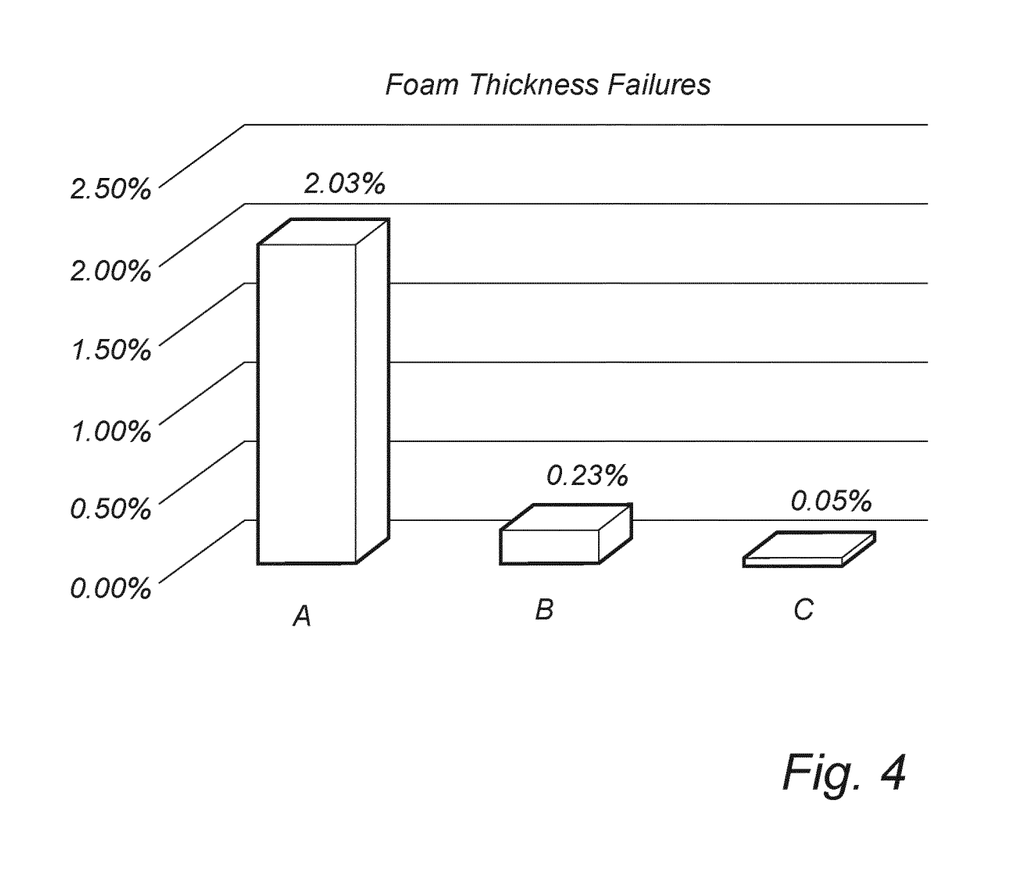
FIG. 4 illustrates a bar chart in which the failure rate when using a prior art system is compared with the failure rate when using a system according to an exemplary embodiment of the invention.

FIG. 4 illustrates a bar chart in which the failure rate when using a prior art system is compared with the failure rate when using a system according to an exemplary embodiment of the invention.

In FIG. 4, the first bar A illustrates the failure rate when using a standard prior art roller system. The failure rate was 2.03%. It should be understood that bar A illustrates a normal failure rate for a prior art system which has been up and running for a substantial time and is thus considered as being a well-tuned process handled by a trained operator.

The second bar B and the third bar C illustrate failure rates when using the plate system of an exemplary embodiment of the invention. The production processes (for bars B and C) had the same specification as the specification in the production process using the prior art roller system (bar A), i.e. same lower and upper limits for foam thickness. The second bar B illustrates the failure rate after one day of production. Thus, already after one day, when the operator had just started learning how to use the system, the failure rate of 0.23% was remarkably lower (i.e. better) than for the prior art system (2.03%). The third bar C illustrates the failure rate after 30 days of production. As demonstrated by bar C, as the operator was learning the system better, the failure rate got even lower, down to 0.05%.

Thus, FIG. 4 demonstrates that the present invention may advantageously be used even by an unexperienced operator, since the inventive system by design provides better conditions for producing foam of desired thickness, reducing the risk of undesired foam thickness variations.

The invention claimed is:

1. A system for controlling the sizing of a rising foam emulsion web travelling on a conveyor, the system comprising:
    a plate arrangement comprising a plurality of plates, the plurality of plates comprising at least a first plate and a second plate, each plate of the plurality of plates having a web-facing lower side that is configured to contact the rising foam emulsion web and an opposite upper side, wherein the second plate is configured to be located downstream of the first plate with respect to the direction of travel of the foam emulsion web; and
    an actuating arrangement comprising a base portion and a top portion, the top portion being movable relative to the base portion and being operatively connected to the plate arrangement, the actuating arrangement being configured to individually set for each plate of the plurality of plates of the plate arrangement a fixed separating distance between the web-facing lower side configured to contact the rising foam emulsion web and the base portion for controlling the rising of the foam emulsion web along at least a part of its travel.

2. The system as claimed in claim 1, wherein the width of each plate increases from an upstream end of the plate to a downstream end of the plate, upstream and downstream being defined with respect to the direction of travel.

3. The system as claimed in claim 1, wherein the plates of the plate arrangement form a truncated triangular shape.

4. The system as claimed in claim 1, wherein the actuating arrangement is configured to individually adjust for each plate of the plate arrangement the inclination of its web-facing lower side relative to the base portion.

5. The system as claimed in claim 1, wherein the allowable separating distance of the first plate relative to the base portion is dependent on the current position of the second plate.

6. The system as claimed in claim 1, wherein the first plate is prevented from having a larger separating distance relative to the base portion than the separating distance of the second plate relative to the base portion.

7. The system as claimed in claim 1, wherein an upstream portion of the second plate is configured to overlap a downstream portion of the first plate.

8. The system as claimed in claim 1, wherein the actuating arrangement comprises a first cross member attached to the first plate and a second cross member attached to the second plate, wherein the actuating arrangement further comprises a first pair of actuators and a second pair of actuators, the first cross member being configured to extend in a transverse direction over the conveyor from one of the actuators to the other one of the actuators of the first pair, and the second cross member being configured to extend in a transverse direction over the conveyor from one of the actuators to the other one of the actuators of the second pair.

9. The system as claimed in claim 1, wherein the plate arrangement comprises one or more further plates located downstream of the second plate.

10. The system as claim in claim 1, wherein the actuating arrangement comprises at least one actuator spindle that is actively actuatable to set for each plate of the plate arrangement a separating distance relative to the base portion.

11. The system as claimed in claim 2, wherein the width of the upstream end of the second plate corresponds to the width of the downstream end of the first plate.

12. The system as claimed in claim 4, wherein each plate is rotatable about a respective geometrical pitch axis extending transversely to the direction of travel, whereby the pitch of each plate relative to the base portion is adjustable so that the spacing between the downstream end of the web-facing lower side and the base portion is larger than the spacing between the upstream end of the web-facing lower side and the base portion.

13. The system as claimed in claim 4, wherein each plate is rotatable about a geometrical roll axis extending in the direction of travel, whereby the roll of each plate relative to the base portion is adjustable.

14. The system as claimed in claim 5, comprising a control unit for controlling the actuating arrangement, wherein the control unit is configured to set an electronic lift limitation, preventing the actuating arrangement from exceeding said allowable separating distance for the first plate.

15. The system as claimed in claim 8, wherein each actuator is individually movable in a vertical direction relative to the conveyor.

16. The system as claimed in claim 8, wherein each cross member is rotatably connected to the respective pair of actuators for enabling inclination of the attached plate.

17. The system as claimed in claim 8, wherein the allowable separating distance of the first plate relative to the base portion is dependent on the current position of the second plate, wherein the system further comprises a control unit for controlling the actuating arrangement, wherein the control unit is configured to set an electronic lift limitation, preventing the actuating arrangement from exceeding said allowable separating distance for the first plate, wherein the control unit is configured to control the vertical movement of each actuator and the rotational orientation of the cross member.

18. The system as claimed in claim 9, wherein the allowable separating distance of the first plate relative to the base portion is dependent on the current position of the second plate, wherein the system further comprises a control unit for controlling the actuating arrangement, wherein the control unit is configured to set an electronic lift limitation, preventing the actuating arrangement from exceeding said allowable separating distance for the first plate, wherein the control unit is configured to set a respective electronic lift limitation to each plate of the plate arrangement, preventing the actuating arrangement from exceeding a respective allowable separating distance of each plate relative to the base portion.

19. The system as claim in claim 10, wherein the at least one actuator spindle of the actuating arrangement is hydraulically actuatable, pneumatically actuatable, or actuatable by an electric motor.

* * * * *